Oct. 23, 1962  A. COX ET AL  3,059,536
ZOOM LENS SYSTEM
Filed May 26, 1961
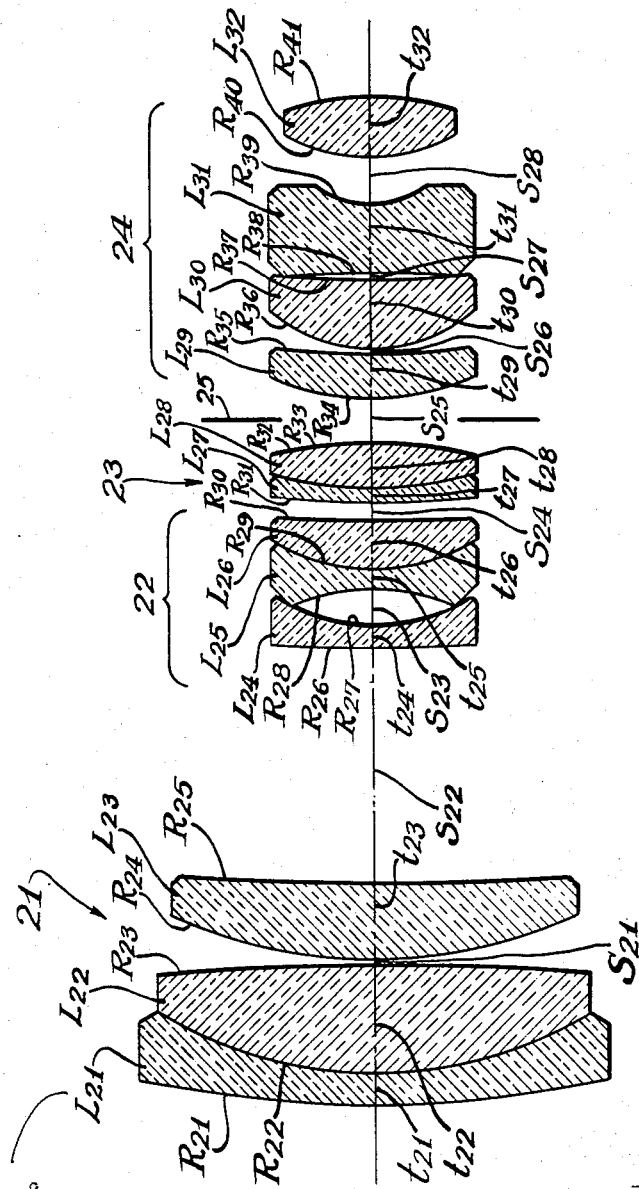
Inventors:
Arthur Cox
Walter J. Johnson
By Robert F. Miehle, Atty.

United States Patent Office 3,059,536
Patented Oct. 23, 1962

3,059,536
ZOOM LENS SYSTEM
Arthur Cox, Park Ridge, and Walter J. Johnson, Mundelein, Ill., assignors to Bell & Howell Company, Chicago, Ill., a corporation of Illinois
Filed May 26, 1961, Ser. No. 112,855
1 Claim. (Cl. 88—57)

This invention relates to a zoom lens, and more particularly to a zoom lens highly corrected over a large range of magnification.

An object of the invention is to provide a miniaturized zoom lens highly corrected over a large range of magnification.

Another object of the invention is to provide a compact inexpensive zoom lens highly corrected over a magnification range of at least three to one.

It is to be understood that the terms "front" and "rear" as herein used refer to the ends of the objective respectively nearer the long and short conjugates thereof.

In the accompanying drawings forming a part hereof, the single FIGURE illustrates a zoom lens described herein and embodying the invention, and shows the zoom lens in the long, equivalent focal length adjustment thereof.

The invention provides a miniaturized zoom lens or variable equivalent focal length objective having a front positive member, an intermediate negative member and a rear positive member. The front positive member is movable non-linearly during zooming and preferably is adjustable for focusing also. The intermediate negative member is movable linearly for zooming, and the rear member is fixed. Preferably, the front member includes a front positive doublet and a rear positive singlet, the intermediate negative member has a front negative meniscus singlet and a biconcave rear doublet, and the rear member comprises a rear prime lens group and a front singlet separated by a stop from the prime lens group and forming an afocal system with the front and intermediate members.

Referring now in detail to the drawings, the zoom lens shown therein includes a front lens member 21, an intermediate lens member 22 and a rear lens member made up of a component or member 23 and a prime lens or member 24 with a stop 25 positioned between the members 23 and 24. The members 23 and 24 are stationary or fixed, and, during zooming, the member 21 is moved non-linearly relative thereto, first moving to the left from its extreme telephoto position shown in FIG. 1 until it reaches the position thereof shown in FIG. 2, which is the intermediate zooming position of unit magnification, and then moves to the right to its extreme wide angle position as shown in FIG. 3. The member 21 also is adjustable relative to the members 22, 23 and 24 for focusing for different object distances, and any focus of the zoom lens for any setting of the member 21 is correct for all zooming positions. During zooming, the member 22 is movable to the left linearly relative to the member 21 from its extreme telephoto position shown in the drawing to its extreme wide angle position. A suitable lens mounting and zooming structure for the zoom lens disclosed herein is disclosed and claimed in co-pending application Serial No. 854,732 filed November 23, 1959, by F. W. Mellberg and assigned to the common assignee.

The front member 21 comprises a front biconvex, cemented doublet $L_{21}$—$L_{22}$ and a rear singlet $L_{23}$ predominantly convex forwardly and spaced closely to the doublet $L_{21}$—$L_{22}$, and having a dispersive internal contact surface $R_{22}$. The mean refractive index of the lens $L_{21}$ exceeds that of the lens $L_{22}$. The linearly movable negative zooming member 22 comprises a front negative meniscus singlet $L_{24}$ convex forwardly and a rear biconcave, cemented doublet component $L_{25}$—$L_{26}$ predominantly concave forwardly. The doublet $L_{25}$—$L_{26}$ has a collective internal contact surface $R_9$ and the mean refractive index of the lens $L_{26}$ exceeds that of the lens $L_{25}$. The stationary member 23 is a positive doublet $L_{27}$ predominantly convex rearwardly, and forms a substantially afocal lens system with the members 21 and 22, it being possible to use this afocal system as an attachment or built in with the prime lens member 24 or with other prime lenses. The prime lens member 24 behind the stop 25 includes a front positive singlet $L_{28}$ predominantly convex forwardly, a biconcave singlet $L_{29}$ predominantly concave forwardly, a positive meniscus singlet $L_{30}$ concave forwardly and a rear biconvex singlet $L_{31}$. The lenses $L_{21}$ to $L_{31}$ have spherical surfaces or radii of curvature $R_{21}$ to $R_{41}$, axial thicknesses $t_{21}$ to $t_{32}$ and axial separations $s_{21}$ to $s_{28}$. The separation $s_{25}$ of the components $L_{27}$ and $L_{28}$ is sufficient to provide clearance for the stop 25 and a known filter member (not shown) which may be selectively inserted into and removed from the space between the components $L_{27}$ and $L_{28}$.

The equivalent focal length of the above-described lens is variable over at least a three to one range of magnification while maintaining a high degree of optical correction for a large aperture of at least $f/1.8$ throughout the range.

A preferred example of the zoom lens forming a specific embodiment of the invention and having a magnification range of about three to one is constructed in conformity with the following table wherein dimensions are in terms of inches and the refractive indices for the sodium D line and the Abbe dispersion numbers are respectively designated at $n_d$ and V:

[$f/1.8$. E.F.L.=1.1737 Telephoto, .6490 Median, .3604 Wide Angle. B.F.L.=.2525]

| | | | | |
|---|---|---|---|---|
| $L_{21}$ | $R_{21}=+2.1867$ | $t_{21}=.061$ | $n_d=1.751$ | $V=27.7$ |
| $L_{22}$ | $R_{22}=+.807$ | $t_{22}=.210$ | $n_d=1.620$ | $V=60.3$ |
| | $R_{23}=-5.0484$ | $s_{21}=.005$ | | |
| $L_{23}$ | $R_{24}=+.950$ | $t_{23}=.150$ | $n_d=1.620$ | $V=60.3$ |
| | $R_{25}=+7.115$ | $s_{22}=\begin{cases}.810\text{ Telephoto}\\.555\text{ Median}\\.050\text{ Wide Angle}\end{cases}$ | | |
| $L_{24}$ | $R_{26}=+3.259$ | $t_{24}=.039$ | $n_d=1.617$ | $V=55.0$ |
| | $R_{27}=+.328$ | $s_{23}=.120$ | | |
| | $R_{28}=-.434$ | | | |
| $L_{25}$ | $R_{29}=+.369$ | $t_{25}=.036$ | $n_d=1.620$ | $V=60.3$ |
| $L_{26}$ | $R_{30}=+7.999$ | $t_{26}=.097$ | $n_d=1.751$ | $V=27.7$ |
| | | $s_{24}=\begin{cases}.0503\text{ Telephoto}\\.5547\text{ Median}\\.8089\text{ Wide Angle}\end{cases}$ | | |
| | $R_{31}=+1.720$ | | | |
| $L_{27}$ | $R_{32}=+.807$ | $t_{27}=.030$ | $n_d=1.751$ | $V=27.7$ |
| $L_{28}$ | $R_{33}=-1.000$ | $t_{28}=.080$ | $n_d=1.620$ | $V=60.3$ |
| | $R_{34}=+.526$ | $s_{25}=.280$ | | |
| $L_{29}$ | $R_{35}=+1.614$ | $t_{29}=.085$ | $n_d=1.620$ | $V=60.3$ |
| | $R_{36}=+.307$ | $s_{26}=.080$ | | |
| $L_{30}$ | $R_{37}=+1.664$ | $t_{30}=.135$ | $n_d=1.620$ | $V=60.3$ |
| | $R_{38}=-5.001$ | $s_{27}=.042$ | | |
| $L_{31}$ | $R_{39}=+.182$ | $t_{31}=.142$ | $n_d=1.751$ | $V=27.7$ |
| | $R_{40}=+.360$ | $s_{28}=.093$ | | |
| $L_{32}$ | $R_{41}=-.572$ | $t_{32}=.105$ | $n_d=1.651$ | $V=55.8$ |

While the invention is thus described, it is not wished to be limited to the precise details described, as changes may be readily made without departing from the spirit of the invention.

What is claimed is:

A zoom lens constructed in substantial compliance with the following table in which dimensions are in terms of inches, and proceeding from front to rear $L_{21}$ to $L_{32}$ designate the lenses, $R_{21}$ to $R_{41}$ the radii of curvature of the surfaces, $t_{21}$ to $t_{31}$ the axial thicknesses, $s_{21}$ to $s_{28}$ the axial separations, $n_d$ the indices of refraction for the sodium D line and V the Abbe dispersion numbers:

[$f./1.8$. E.F.L.=1.1737 Telephoto, .6490 Median, .3604 Wide Angle. B.F.L.=.2525]

| Lens | Radius | Thickness/Separation | $n_d$ | V |
|---|---|---|---|---|
| $L_{21}$ | $R_{21}=+2.1867$ | $t_{21}=.061$ | $n_d=1.751$ | $V=27.7$ |
|  | $R_{22}=+.807$ |  |  |  |
| $L_{22}$ |  | $t_{22}=.210$ | $n_d=1.620$ | $V=60.3$ |
|  | $R_{23}=-5.0484$ |  |  |  |
|  |  | $s_{21}=.005$ |  |  |
|  | $R_{24}=+.950$ |  |  |  |
| $L_{23}$ |  | $t_{23}=.150$ | $n_d=1.620$ | $V=60.3$ |
|  | $R_{25}=+7.115$ |  |  |  |
|  |  | $s_{22}=\begin{cases}.810\text{ Telephoto}\\.555\text{ Median}\\.050\text{ Wide Angle}\end{cases}$ |  |  |
|  | $R_{26}=+3.259$ |  |  |  |
| $L_{24}$ |  | $t_{24}=.039$ | $n_d=1.617$ | $V=55.0$ |
|  | $R_{27}=+.328$ |  |  |  |
|  |  | $s_{23}=.120$ |  |  |
|  | $R_{28}=-.434$ |  |  |  |
| $L_{25}$ |  | $t_{25}=.036$ | $n_d=1.620$ | $V=60.3$ |
|  | $R_{29}=+.369$ |  |  |  |
| $L_{26}$ |  | $t_{26}=.097$ | $n_d=1.751$ | $V=27.7$ |
|  | $R_{30}=+7.999$ |  |  |  |
|  |  | $s_{24}=\begin{cases}.0503\text{ Telephoto}\\.5547\text{ Median}\\.8089\text{ Wide Angle}\end{cases}$ |  |  |
|  | $R_{31}=+1.720$ |  |  |  |
| $L_{27}$ |  | $t_{27}=.030$ | $n_d=1.751$ | $V=27.7$ |
|  | $R_{32}=+.807$ |  |  |  |
| $L_{28}$ |  | $t_{28}=.080$ | $n_d=1.620$ | $V=60.3$ |
|  | $R_{33}=-1.000$ |  |  |  |
|  |  | $s_{25}=.280$ |  |  |
|  | $R_{34}=+.526$ |  |  |  |
| $L_{29}$ |  | $t_{29}=.085$ | $n_d=1.620$ | $V=60.3$ |
|  | $R_{35}=+1.614$ |  |  |  |
|  |  | $s_{26}=.080$ |  |  |
|  | $R_{36}=+.307$ |  |  |  |
| $L_{30}$ |  | $t_{30}=.135$ | $n_d=1.620$ | $V=60.3$ |
|  | $R_{37}=+1.664$ |  |  |  |
|  |  | $s_{27}=.042$ |  |  |
|  | $R_{38}=-5.001$ |  |  |  |
| $L_{31}$ |  | $t_{31}=.142$ | $n_d=1.751$ | $V=27.7$ |
|  | $R_{39}=+.182$ |  |  |  |
|  |  | $s_{28}=.093$ |  |  |
|  | $R_{40}=+.360$ |  |  |  |
| $L_{32}$ |  | $t_{32}=.105$ | $n_d=1.651$ | $V=55.8$ |
|  | $R_{41}=-.572$ |  |  |  |

No references cited.